(12) United States Patent
Ridge et al.

(10) Patent No.: US 7,586,425 B2
(45) Date of Patent: Sep. 8, 2009

(54) SCALABLE VIDEO CODING AND DECODING

(75) Inventors: Justin Ridge, Sachse, TX (US);
Xianglin Wang, Santa Clara, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/775,141

(22) Filed: Jul. 9, 2007

(65) Prior Publication Data
US 2008/0048894 A1 Feb. 28, 2008

Related U.S. Application Data

(60) Provisional application No. 60/830,389, filed on Jul. 11, 2006.

(51) Int. Cl.
*H03M 7/40* (2006.01)
(52) U.S. Cl. .............................. 341/67; 341/50; 341/53; 341/65; 341/107
(58) Field of Classification Search .................. 341/63, 341/67, 53, 50, 51, 65, 107; 345/537; 382/245; 375/240.23
See application file for complete search history.

(56) References Cited

U.S. PATENT DOCUMENTS

| | | | |
|---|---|---|---|
| 5,021,879 A | 6/1991 | Vogel | |
| 6,300,888 B1 * | 10/2001 | Chen et al. | 341/63 |
| 6,781,589 B2 * | 8/2004 | Macy et al. | 345/537 |
| 7,103,102 B2 * | 9/2006 | Youn et al. | 375/240.23 |
| 7,203,373 B2 * | 4/2007 | Zhou | 382/245 |
| 2003/0118243 A1 | 6/2003 | Sezer et al. | |
| 2006/0119490 A1 * | 6/2006 | Lim et al. | 341/50 |
| 2007/0046504 A1 | 3/2007 | Ridge et al. | |
| 2007/0053425 A1 | 3/2007 | Ridge et al. | |
| 2007/0126853 A1 | 6/2007 | Ridge et al. | |

FOREIGN PATENT DOCUMENTS

WO   WO 2007/039795   4/2007

OTHER PUBLICATIONS

International Search Report for PCt Application PCT/IB2007/052754.

* cited by examiner

*Primary Examiner*—Jean B Jeanglaude
(74) *Attorney, Agent, or Firm*—Foley & Lardner, LLP

(57) ABSTRACT

A method for coding spatial and quality enhancement information in scalable video coding using variable length codes. Conventional systems have been capable of using variable length codes only with nonscalable video coding, In the present invention, the coded block pattern for each block of information, significance passes, and refinement passes can all be coded with different types of variable length codes. The present invention also provides for a variable length encoder/decoder that dynamically adapts to the actual symbol probability. The encoder/decoder of the present invention counts the number of times each symbol is coded. Based upon these counts, the encoder/decoder selects how many symbols to group when forming a code word. The encoder also uses these counts to select the specific codeword that should be used.

26 Claims, 3 Drawing Sheets

SCALABLE VIDEO CODING AND DECODING

CROSS-REFERENCE TO RELATED APPLICATIONS

The present application claims priority to U.S. Provisional Patent Application No. 60/830,389, filed Jul. 11, 2006.

FIELD OF THE INVENTION

The present invention relates generally to the field of video coding. More particularly, the present invention relates to scalable video coding and decoding.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). In addition, there are currently efforts underway with regards to the development of new video coding standards. One such standard under development is the scalable video coding (SVC) standard, which will become the scalable extension to the H.264/AVC standard.

Conventional video coding standards such as MPEG-1, H.261/263/264 encode video either at a given quality setting or at a relatively constant bit rate via the use of a rate control mechanism. If the video needs to be transmitted or decoded at a different quality, the data must first be decoded and then re-encoded using the appropriate setting. In some scenarios, such as in low-delay real-time applications, this "transcoding" procedure may not be feasible.

Scalable video coding overcomes this problem by encoding a "base layer" with some minimal quality, and then encoding enhancement information that increases the quality up to a maximum level. In addition to selecting between the "base" and "maximum" qualities through inclusion or exclusion of the enhancement information in its entirety, the enhancement information may often be truncated at discrete points, permitting intermediate qualities between the "base" layer and "maximum" enhancement layer. In cases where the discrete truncation points are closely-spaced, the scalability is referred to as being "fine-grained," from which the term "fine grained scalability" (FGS) is derived. A "progressive-refinement (PR) slice," which is also known as FGS, is introduced in Annex F of the H.264/AVC video coding standard.

A key characteristic of FGS slices is that their truncation results in an almost proportional loss of perceptual quality. For example, truncating a FGS slice to 75% of its original length may result in losing 25% of the perceptual benefit attributable to the FGS slice, as opposed to a catastrophic failure whereby 90% of the perceptual benefit is lost.

In fine grain scalability, transform coefficients are encoded in successive refinements, starting with the minimum quality provided by AVC compatible intra/residual coding. This is accomplished by repeatedly decreasing the quantization step size and applying a modified entropy coding process similar to sub-bitplane coding. For each quality enhancement layer, the coding process for the transform coefficient refinement levels is divided into two scans. Coefficients that were not zero in the previous layer (or layers) are classified as belonging to a "significance pass." Other coefficients belong to the "refinement pass." The entropy coding mechanism used for a given coefficient depends on whether it was classified as belonging to the "significance pass" or the "refinement pass." In practice, the two passes may be interleaved, so that a coefficient belonging to the refinement pass is coded between two coefficients belonging to the significance pass; however, the distinction in entropy coding remains.

When variable length codes (VLCs) are used to code coefficients in FGS slices, coefficient magnitudes are initially assumed to be 0 or 1. Coefficient magnitudes of two or greater are generally rare, and are due to H.264/AVC features such as isolated coefficient removal. To include magnitudes greater than one in the VLC design when these magnitudes have a low probability would lead to a design with reduced coding efficiency. Instead, information about the number of coefficients in a block with magnitude greater than 1, and the maximum magnitude in the block, is embedded into the end-of-block (EOB) symbol. Any such "high magnitude" coefficients are then coded following the EOB symbol. It is desirable to code these "high magnitude" coefficients in the most efficient way possible.

According to Annex F of the H.264/AVC standard, information about the number of coefficients with magnitude greater than 1 (CountMag2), and the maximum magnitude (MaxMag), is extracted from EOB symbol using the following pseudo-code:

```
if ( EOBsymbol < NumSigCoeff*2 )
{
   MaxMag   = (EOBsymbol % 2) + 2;
   CountMag2 = (EOBsymbol / 2) + 1;
} else {
   MaxMag   = (EOBsymbol / NumSigCoeff) + 2;
   CountMag2 = (EOBsymbol % NumSigCoeff) + 1;
}
```

NumSigCoeff indicates the number of coefficients that were found to have a magnitude of 1 or greater. This value is known from the coefficients coded prior to the EOB symbol. The "%" symbol indicates the "modulus" operator (or "remainder when divided by").

As an example, one can assume a vector of significance pass coefficients is {0, 0, 1, 0, 1, 2, 1, 0}. When decoding, all magnitudes would initially be decoded as 1, i.e. {0, 0, 1, 0, 1, 1, 1, 0}, followed by an EOBsymbol=0. The NumSigCoeff value is known to be 4 from the decoded coefficient values. According to the above pseudo-code, MaxMag=(0% 2)+2=2, and CountMag2=(0/2)+1=1. Therefore, it is known that one out of the four non-zero coefficients has a magnitude of two. The only remaining question is which one out of the four has this magnitude.

The location and exact magnitudes of the coefficients are decoded using exp-Golomb codes. However, since the values of MaxMag and CountMag2 are known, it is sometimes possible terminate coding early. Continuing the above example, there are four coefficients decoded with magnitude 1. These can be written as {1, 1, 1, 1}. It is also recalled that the original coefficient values are {1, 1, 2, 1}. In decoding the exp-Golomb codes, a zero bit is decoded for the first of these coefficients, indicating that its magnitude is no greater than 1. Similarly, a zero is decoded for the second coefficient. For the third coefficient, the exp-Golomb code can be truncated and simply decoded as "1" rather than "1 0" since the maximum magnitude (MaxMag) is known. The fourth coefficient does not need to be refined at all, since it is known that CountMag2=1. Therefore, only 3 bits are required to refine the "high magnitude" values instead of 5 that would be needed if complete exp-Golomb codes were used.

Unfortunately, there are two problems with the existing approach depicted above. First, the formula used to compute MaxMag and CountMag2 from the EOB symbol is designed based on the assumption that these values are typically small (for example, less than 4). When either or both of these values are large, the number of bits required to code the EOB symbol itself becomes prohibitively large. Because motion compensation has recently been added to FGS slices, the possibility of this problem occurring is now greater than when the scheme was initially designed. Second, the exp-Golomb may not be the most efficient VLC when the values of MaxMag or CountMag2 are large. For example, in some situations it may be better to code the magnitude of each coefficient using a binary representation rather than exp-Golomb. In other situations, it may be better to use a trained VLC known to both encoder and decoder.

SUMMARY OF THE INVENTION

The present invention provides an improved coding efficiency while coding the transform coefficient refinement levels. The invention observes the high likelihood of the high-magnitude refinement coefficient levels under certain coding conditions, and advantageously determines tradeoff thresholds to adapt the coding of the EOB symbol that conveys information associated with the remaining number of coefficients in a block with magnitude greater than 1, as well as the maximum magnitude in the block. The present invention also proposes a variable-length coding (VLC) method to encode high magnitude values, wherein the VLC table to be used is conveyed in the EOB symbol. The present invention results in an improvement in coding efficiency over conventional arrangements.

The present invention can be implemented directly in software using any common programming language, e.g. C/C++, or assembly language. The present invention can also be implemented in hardware and used in a wide variety of consumer devices.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
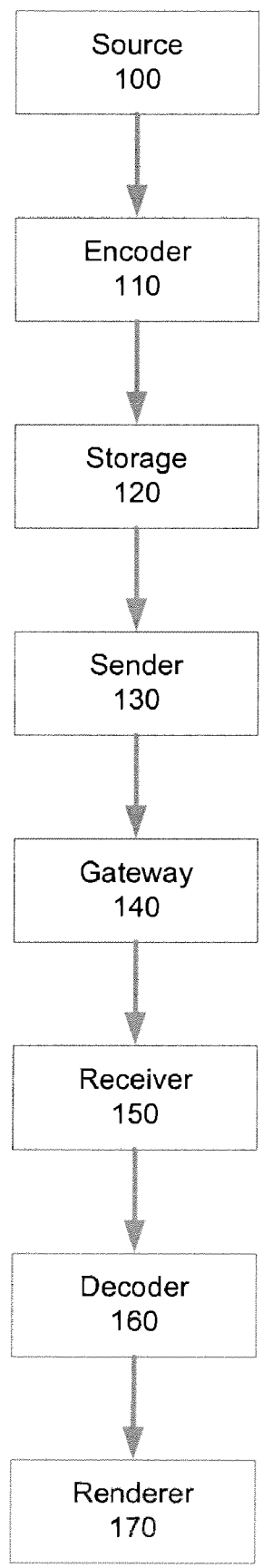
FIG. 1 shows a generic multimedia communications system for use with the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should again be noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data streams according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

Alternatively, the coded media bitstream may be transferred from the sender 130 to the receiver 150 by other means, such as storing the coded media bitstream to a portable mass memory disk or device when the disk or device is connected to the sender 130 and then connecting the disk or device to the receiver 150.

The system includes one or more receivers 150, typically capable of receiving, de-modulating, and de-capsulating the transmitted signal into a coded media bitstream. De-capsulating may include the removal of data that receivers are incapable of decoding or that is not desired to be decoded. The codec media bitstream is typically processed further by a decoder 160, whose output is one or more uncompressed media streams. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Various embodiments of the present invention provide improved coding efficiency while coding the transform coefficient refinement levels by addressing two principal problems with the conventional approach to coding "high magnitude" coefficients in Annex F of H.264/AVC: the EOB symbol itself and the VLC used to refine high magnitude coefficients. The invention observes the high likelihood of the high-magnitude refinement coefficient levels under certain coding conditions, and advantageously determines tradeoff thresholds to adapt the coding of the EOB symbol that conveys information associated with the remaining number of coefficients in a block with magnitude greater than 1, as well as the maximum magnitude in the block. For example, the tradeoff thresholds may be determined according to an input signal which limits either or both the values of MaxMag and CountMag2.

In one embodiment of the invention, MaxMag is capped so that a value of MaxMag=4 indicates that the block contains at least one coefficient with value of 4 or higher. In this case, the precise value of MaxMag is unknown, and coding of the exp-Golomb codes cannot be terminated early, which is contrary to what occurs in conventional arrangements as discussed previously. Although this may result in a few extra bits being coded, the EOB symbol is potentially much smaller, thus requiring fewer bits and resulting in a net saving of bits.

In another embodiment of the invention, CountMag2 is capped so that a value of CountMag2=6 indicates that the block contains at least 6 coefficients with magnitude greater than 1. The precise value of CountMag2 is unknown so that coding of the exp-Golomb codes could not be terminated early. Although this may also result in a few extra bits being coded, the EOB symbol is potentially much smaller, thus requiring fewer bits and resulting in a net saving of bits.

In still another embodiment of the present invention, the cap on CountMag2 is not a constant number, but instead is at least partially relative to the number of non-zero coefficients in the block, NumSigCoeff. For example, a value of CountMag2 in the range 1 . . . 3 may indicate the exact number of coefficients with a magnitude greater than 1; CountMag2=4 may indicate that at least the greater of 4 or half of NumSigCoeff coefficients have a magnitude greater than 1; and CountMag2=5 may indicate that at least the greater of 5 or three-quarters of NumSigCoeff coefficients have a magnitude greater than 1.

The present invention also involves the utilization of a VLC code for refining coefficients with a magnitude greater than 1. In one embodiment, the invention uses a VLC known to both the encoder and the decoder for refining coefficient magnitudes. The VLC that is selected may depend upon one or more of the values of NumSigCoeff, MaxMag, and CountMag2. For example, one VLC may be used if MaxMag<4, and a different VLC may be used if MaxMag>=4. In cases where more than one of the values NumSigCoeff, MaxMag and CountMag2 is used, a lookup table may be utilized to determine which VLC is used.

In a further embodiment of the present invention, the invention uses binary values to code coefficient magnitudes. In this embodiment, for example, given MaxMag=4, 00 means a magnitude of 1, 01 means a magnitude of 2, 10 means a magnitude of 3, and 11 means a magnitude of 4. In the event that MaxMag is not a power of two, early truncation of the coding process may be used, since not all binary values are permitted.

In still another embodiment, a VLC table to be used is embedded in the EOB symbol. This may occur along with, or instead of, the values MaxMag and CountMag2, which are already embedded in the EOB symbol. In this embodiment, the EOB symbol is a function that takes MaxMag, CountMag2 and/or the VLC table index as parameters.

In a particular embodiment of the present invention, the pseudo-code discussed previously with regard to conventional arrangements is modified as follows:

```
if ( EOBsymbol < 8 )
{
   MaxMag   = (EOBsymbol % 2) + 2;
   CountMag2 = (EOBsymbol / 2) + 1;
   VLC      = 1;
} else {
   MaxMag   = (EOBsymbol % 2 ) + 4;
   CountMag2 = (EOBsymbol / 16);
   VLC      = 2;
}
```

In the above embodiment, MaxMag is capped at 5, i.e. MaxMag=5 means that the maximum coefficient magnitude is at least 5. Similarly, CountMag2 is capped at 4 for MaxMag<4. The value of EOBsymbol also provides a VLC table index to be used in refining magnitude information. In one embodiment, a VLC=1 indicates exp-Golomb, and a VLC=2 indicates a binary representation of the coefficient magnitude minus 1. It should be noted that the VLC indication may be explicitly coded. In other words, the VLC indication may be determined directly from the EOB symbol value, rather than inferred from the maximum magnitude or number of coefficients.

In another embodiment of the invention, the pseudo-code is modified as follows:

```
if ( EOBsymbol < 4 )
{
   MaxMag   = 5;
   CountMag2 = 6;
   VLC      = EOBsymbol + 1;
} else {
   MaxMag   = (EOBsymbol / 4) % 4 ) + 1;
```

```
CountMag2 = min(6, EOBsymbol / 16);
VLC      = 0;
}
```

In another embodiment, the VLC used for encoding high magnitude coefficients involves binarizing the magnitude values and forming a VLC codeword based on bitplane values. This can be particularly useful if the maximum magnitude (MaxMag) is small, but the number of coefficients with magnitude greater than 1 is large. For example, if the vector of coefficients is {1, 1, 2, 1, 1}, using a VLC to code the individual magnitudes of each coefficient is not very beneficial. But, if the VLC codeword is formed based on the bitplane 00100, the probability of the various magnitudes may be better approximated.

It should be noted that, although the various embodiments of the present invention described herein are described in the context of significance pass coding for FGS slices in the H.264/AVC standard, some or all of these embodiments can be similarly applied to other types of coefficients (e.g., refinement coefficients), other types of values (e.g., pixel values instead of coefficients), other slice types, or other video coders.

Figure 2:
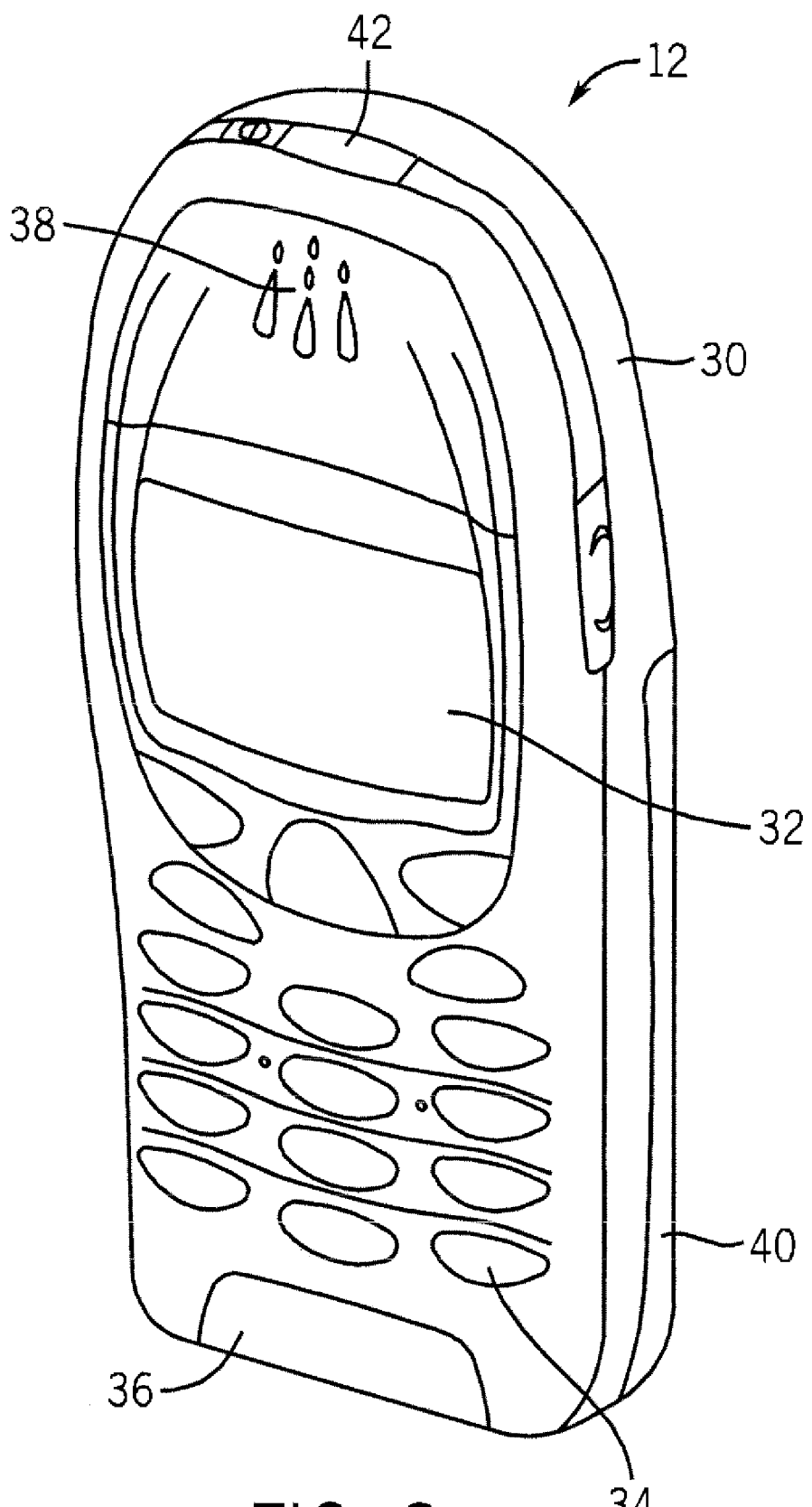
FIG. 2 is a perspective view of a mobile telephone that can be used in the implementation of the present invention.
Figure 3:
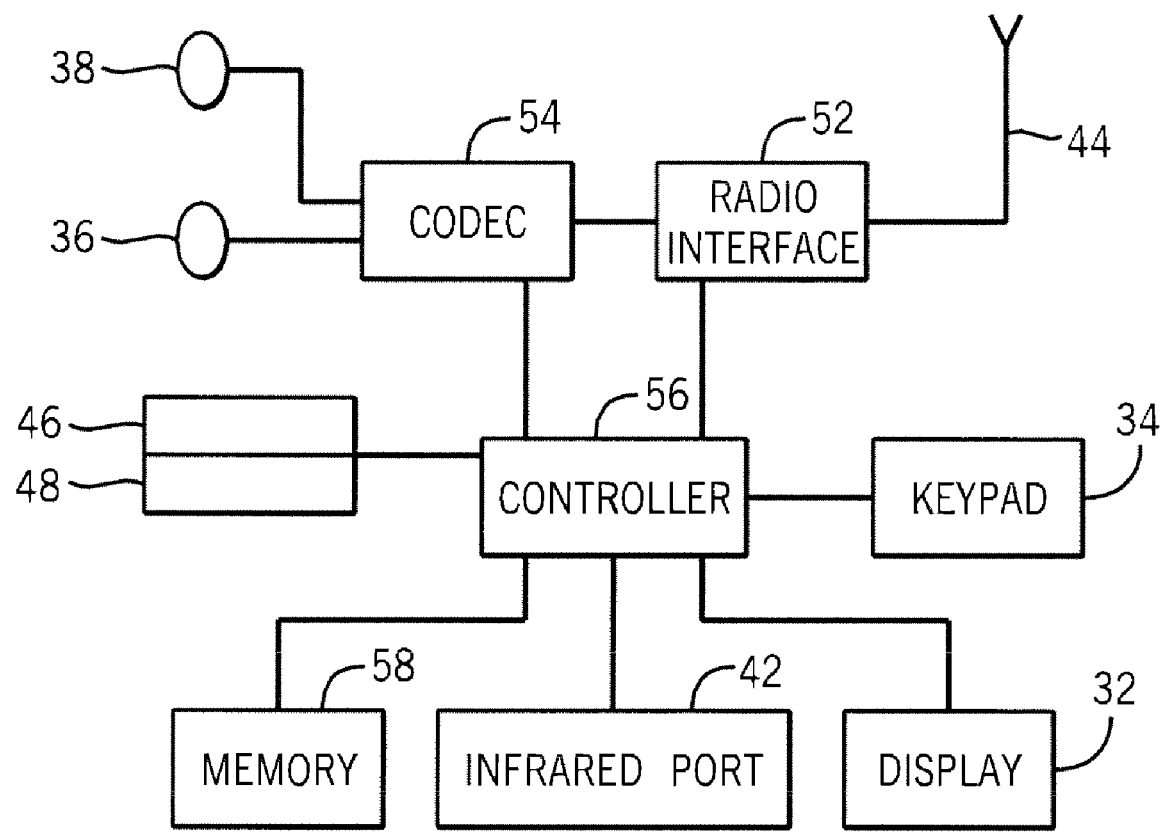
FIG. 3 is a schematic representation of the circuitry of the mobile telephone of FIG. 2.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of decoding a block of values from a bit stream, comprising:
    decoding from the bit stream an indication of a run length terminated by a value with a magnitude greater than zero;
    determining whether the indication belongs to a class of symbols indicating that no non-zero values remain to be decoded in the block;
    when the indication belongs to the class of symbols, determining, based on the indication, whether any of the non-zero values in the block have a magnitude greater than 1,
    wherein the indication provides information comprising at least one of:
        a maximum magnitude of values in the block,
        a number of values in the block with a magnitude greater than 1, and
        a variable length code (VLC) index indicating a VLC to be used in decoding magnitudes for non-zero values in the block.

2. The method of claim 1, wherein at least one of the maximum magnitude of values in the block and the number of values in the block with a magnitude greater than 1 are limited to a maximum value.

3. The method of claim 2, wherein the maximum value is determined from previously decoded information.

4. The method of claim 3, wherein the previously decoded information includes the number of non-zero values in the current block.

5. The method of claim 1, wherein a VLC is used to decode magnitude refinement information following decoding the indication.

6. The method of claim 5, wherein the VLC depends upon the value of the indication.

7. A computer program product, embodied in a computer readable medium, for decoding a block of values from a bit stream, comprising:
    computer code for decoding from the bit stream an indication of a run length terminated by a value with a magnitude greater than zero;
    computer code for determining whether the indication belongs to a class of symbols indicating that no non-zero values remain to be decoded in the block;
    computer code for, when the indication belongs to the class of symbols,
    determining, based on the indication, whether any of the non-zero values in the block have a magnitude greater than 1,
    wherein the indication provides information comprising at least one of:
        a maximum magnitude of values in the block, a number of values in the block with a magnitude greater than 1, and a variable length code (VLC) index indicating a VLC to be used in decoding magnitudes for non-zero values in the block.

8. An apparatus, comprising:

a processor configured to decode from a bit stream an indication of a run length terminated by a value with a magnitude greater than zero;

determine whether the indication belongs to a class of symbols indicating that no non-zero values remain to be decoded in the block;

when the indication belongs to the class of symbols, determine, based on the indication, whether any of the non-zero values in the block have a magnitude greater than 1, wherein the indication provides information comprising at least one of:

a maximum magnitude of values in the block, a number of values in the block with a magnitude greater than 1, and a variable length code (VLC) index indicating a VLC to be used in decoding magnitudes for non-zero values in the block.

9. The apparatus of claim 8, wherein at least one of the maximum magnitude of values in the block and the number of values in the block with a magnitude greater than 1 are limited to a maximum values.

10. The apparatus of claim 9, wherein the maximum value is determined from previously decoded information.

11. The apparatus of claim 10, wherein the previously decoded information includes the number of non-zero values in the current block.

12. The apparatus of claim 8, wherein a VLC is used to decode magnitude refinement information following decoding the indication.

13. The apparatus of claim 12, wherein the VLC depends upon the value of the indication.

14. A method of encoding a block of values into a bit stream, comprising:

determining whether any non-zero values in the block remain to be encoded;

when any non-zero values remain to be encoded:

encoding into the bit stream an indication of a run length terminated by a value with a magnitude greater than zero;

returning to the determining of whether any non-zero values remain;

when no non-zero values remain to be encoded, encoding into the bit stream an end of block (EOB) symbol, wherein the EOB symbol is selected based upon at least one of a maximum magnitude of values in the block, a number of values in the block with a magnitude greater than 1, and a variable length code (VLC) index indicating a VLC to be used in encoding magnitudes for non-zero values in the block.

15. The method of claim 14, wherein at least one of the maximum magnitude of values in the block and the number of values in the block with a magnitude greater than 1 are limited to a maximum values.

16. The method of claim 15, wherein the maximum value is determined from previously encoded information.

17. The method of claim 16, wherein the previously encoded information includes the number of non-zero values in the current block.

18. The method of claim 14, wherein a VLC is used to encode magnitude refinement information following encoding of the EOB symbol.

19. The method of claim 18, wherein the VLC depends upon the value of the EOB symbol.

20. A computer program product, embodied in a computer-readable medium, for encoding a block of values into a bit stream, comprising:

computer code for determining whether any non-zero values in the block remain to be encoded;

computer code for, when any non-zero values remain to be encoded:

encoding into the bit stream an indication of a run length terminated by a value with a magnitude greater than zero;

returning to the determining of whether any non-zero values remain;

computer code for, when no non-zero values remain to be encoded, encoding into the bit stream an end of block (EOB) symbol, wherein the EOB symbol is selected based upon at least one of a maximum magnitude of values in the block, a number of values in the block with a magnitude greater than 1, and a variable length code (VLC) index indicating a VLC to be used in encoding magnitudes for non-zero values in the block.

21. An apparatus, comprising:

a processor configured to:

determine whether any non-zero values in the block remain to be encoded;

when any non-zero values remain to be encoded:

encode into the bit stream an indication of a run length terminated by a value with a magnitude greater than zero;

return to the determining of whether any non-zero values remain;

when no non-zero values remain to be encoded, encode into the bit stream an end of block (EOB) symbol, wherein the EOB symbol is selected based upon at least one of a maximum magnitude of values in the block, a number of values in the block with a magnitude greater than 1, and a variable length code (VLC) index indicating a VLC to be used in encoding magnitudes for non-zero values in the block.

22. The apparatus of claim 21, wherein at least one of the maximum magnitude of values in the block and the number of values in the block with a magnitude greater than 1 are limited to a maximum value.

23. The apparatus of claim 22, wherein the maximum value is determined from previously encoded information.

24. The apparatus of claim 23, wherein the previously encoded information includes the number of non-zero values in the current block.

25. The apparatus of claim 21, wherein a VLC is used to encode magnitude refinement information following encoding of the EOB symbol.

26. The apparatus of claim 25, wherein the VLC depends upon the value of the EOB symbol.

* * * * *